March 25, 1969 KEISUKE SATO 3,435,300

ERASER AND CLEANER SET

Filed Dec. 28, 1966

INVENTOR
KEISUKE SATO

United States Patent Office 3,435,300
Patented Mar. 25, 1969

3,435,300
ERASER AND CLEANER SET

Keisuke Sato, Tokyo, Japan, assignor to Akai Electric Company Limited, Tokyo, Japan, a corporation of Japan Filed Dec. 28, 1966, Ser. No. 605,481
Int. Cl. H01f 13/00
U.S. Cl. 317—157.5 4 Claims This invention relates to a novel eraser and cleaner set adapted for use with audio and/or video tape recorders. More specifically, it relates to a novel device designed for jointly or separately erasing residual magnetism accumulated in magnetic head cores and cleaning magnetic and other dust or sticky particles deposited on the front surface and in the working slit gap of magnetic heads of an audio or video tape recorder.

As in commonly known, when a tape recorder has been used frequently for an extended time period, foreign substances, such as magnetic particles, dust, grease and oil, which are originally attached to the working surface of the magnetic tape are transferred to and deposited on the front surface of each of the magnetic heads fitted on the tape recorder and kept in contact with the magnetic layer of the tape, especially in and around the slit gap. When such troubles are met, a considerable drop of the signal level recorded and reproduced, especially higher frequency components thereof, will be invited when the head is a recording, reproducing, biasing or combined head, as the case may be, when it is an erase head, insufficient erasure of recorded signal will take place. In addition, considerable wow or flatter will also be invited on account of possible irregularities of the tape running speed.

For avoiding such troubles and for cleaning the dust-deposited and fouled head, tape recorder utilizers must periodically, for instance once a week, wipe carefully the working surface by a wiper normally consisting of absorbing and fibrous material such as cotton, cloth or the like, impregnated with a suitable inert solvent such as absolute alcohol, carbon tetrachloride, benzene or the like. This procedure is highly troublesome and time-consuming.

On the other hand, magnetic heads, especially reproduce or playback heads, will accumulate residual magnetism when they are frequently used for a considerable time period such as a week or so, which results in an increased noise appearing in the reproduced signal and thus in a correspondingly lowered signal noise ratio thereof. In order to avoid this drawback, frequent use of an eraser for the deenergization of the residually magnetized head would become necessary.

It is, therefore, the main object of the present invention to provide a novel eraser and cleaner combined unit adapted for conveniently carrying out either the magnetic erasure or head cleaning of the above kind or the both.

These and further objects, features and advantages of the invention will become more clear as the description proceeds in conjunction with the accompanying drawing illustrative in no limiting sense of a preferred embodiment of the invention.

Figure 1:
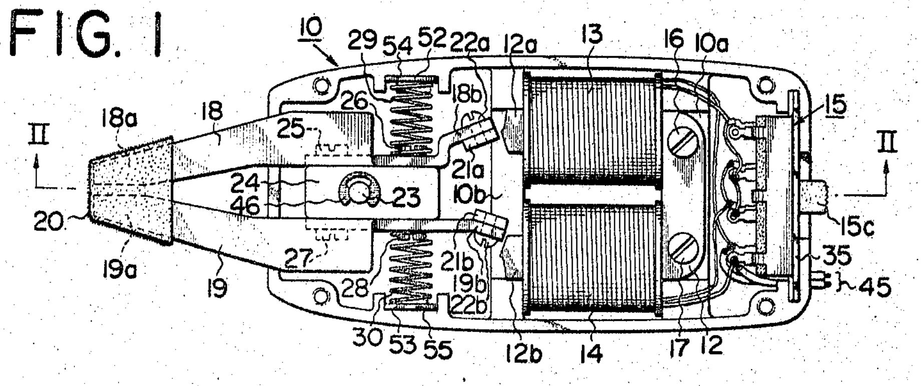
FIG. 1 shows a top plan view of an eraser and cleaner combined set wherein however its cover has been removed for illustrating its inner working parts.
Figure 2:
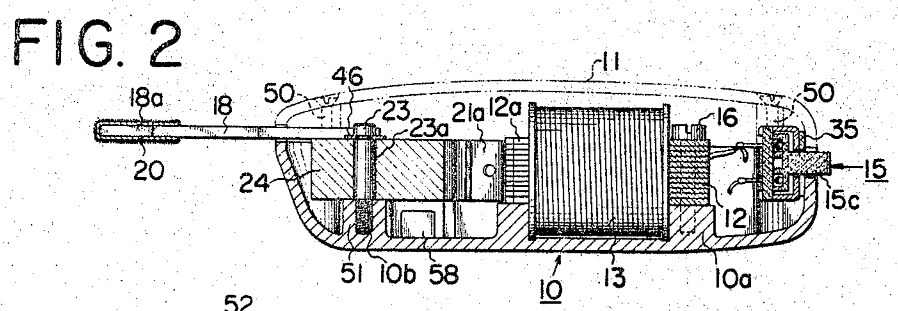
FIG. 2 is a longitudinal section of the combined set taken on the line II—II in FIG. 1, with its cover additionally shown in chain-dotted lines.

Now referring to the accompanying drawing, especially FIGS. 1 and 2 thereby, 10 denotes a casing body adapted for combination with a cover cap 11 which is shown only in FIG. 2 and in chain-dotted lines. These casing elements 1, 2 are preferably made of a rigid plastic material such as polyvinyl chloride, acrylic resin or the like and rigidly, yet detachably united together by means of a plurality of set screws generally denoted by a numeral 50.

Figures 3, 4, 5:
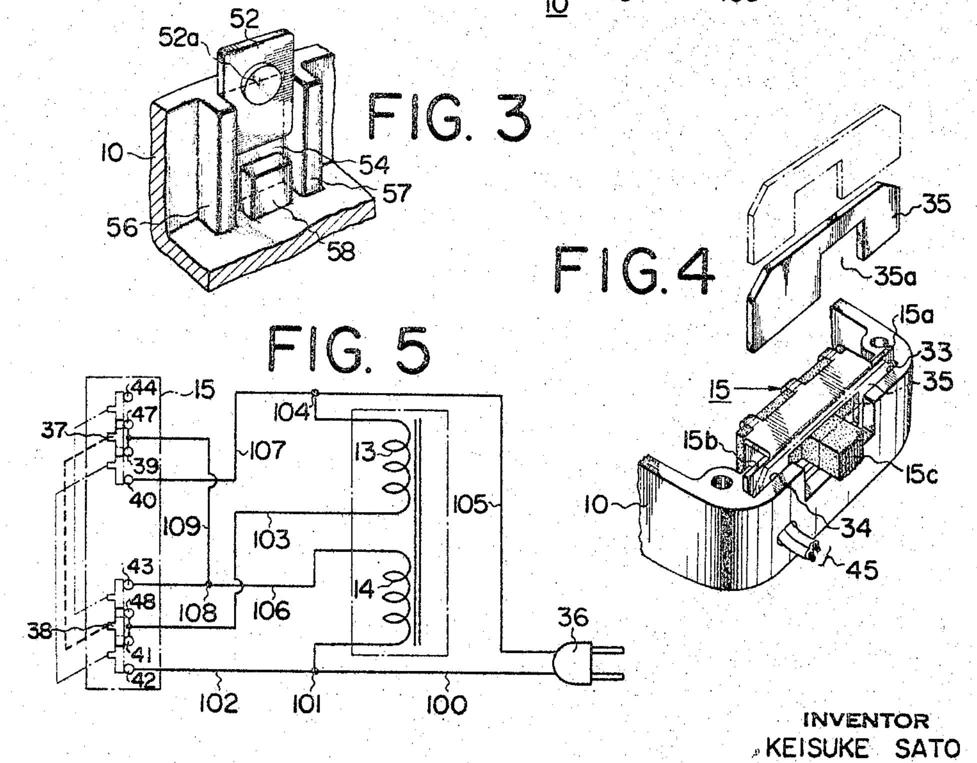
FIG. 3 is an enlarged perspective view illustrative of a part of the combined unit which is adapted to receive one end of a vibrating spring, keeping the latter in position.
FIG. 4 is an enlarged perspective view illustrative of a part of the combined unit which houses an operating switch.
FIG. 5 is the wiring diagram of an electric circuit embodied in the combined unit.

A channel-shaped magnetic core 12 is provided with a pair of windings 13 and 14 which are electrically connected, as shown in FIG. 5 through a push-button type gang switch generally shown by numeral 15; insulated cord 45 and a plug 36 to a current source, not shown, so as to form an electromagnet. The core 12 is mounted on two laterally-extending projections **10*a* and 10*b* formed on the bottom wall of the lower casing element 10, and fixed in position by two set screws 16 and 17. Vibrator elements 18 and 19 made of magnetic material are provided at their tip ends 18*a* and 19*a* in common with a cleaner member 20 made of rubber, plastic, felt, or the like frictional material, preferably embedded and stuck with a large number of rigid fibers and shaped into a blind sheath. These vibrator elements 18 and 19 are formed integrally with projecting arms 18*b* and 19*b*, respectively, which are fitted rigidly at their tip ends with magnetic elements 21*a* and 21*b*, respectively, by means of respective set screws 22*a* and 22*b*, in such a way that the magnetic elements are kept at a small distance from the poles 12*a* and 12*b* of the magnetic core 12 under the balance resilient action provided by a pair of compression springs 29 and 30 when the whole unit is at rest. For this purpose, the arms 18*b* and 19*b* are rigidly attached to a piece 24, made of non-magnetic material, by means of two pairs of fixing screws 25, 26 and 27, 28, said piece being pivotable about a pivot 23 which is studded at its lower end into a tapped hole 10*b* formed in a mounting projection 51 on the bottom of the lower casing element 10. For the prevention of possible slipping of the pivotable piece 24 out of the pivot 23, there is provided a spring clip 46 detachably received in a circular groove 23*a* formed in the said pivot in close proximity of its top. Compression springs 29 and 30 are caught at their one side ends by fixing screws 26 and 28, respectively, while their other ends abut through plastic pads 52 and 53 against respective reception recesses 54 and 55, respectively, formed on the inside wall surface of the lower casing element 10**.

As seen in FIG. 3, pad 52 having an integral positioning projection **52*a* for the spring 29 is slidably mounted in said recess 54 defined by two small paralleled flanges 56 and 57 made integral with the casing element 10, said pad being kept in its fully inserted position by a stationary stopper 58 extending upwardly from the bottom wall of the casing wall. When it is desired to exchange the compression spring 29 by another, the slidable pad 52 is manually drawn upwards and the spring will be simultaneously dismantled from the whole device in an easy manner. The re-attachment may also be conveniently carried out by pushing the pad into the reception recess 54 upon putting the corresponding end of the spring into engagement with said projection 52*a*, while the opposite spring end is positioned around the head of the fixing screw 26**.

For another compression spring, similar spring reception means as shown in FIG. 3 is also provided, as easily supposed by reference to FIGS. 1 and 2, although detailed description thereof has been omitted in the specification for simplicity thereof.

Next referring to FIG. 4, illustrating a transfer switch arrangement employed in the present embodiment, there is provided a pair of side grooves 33 and 34, each of which has enough width to receive snugly the side flange at 15*a* or 15*b* of the gang switch unit 15, and the corresponding extremity of a switching control panel 35.

The control panel is formed at its off-centered position with a rectangular opening 35*a* for limiting the operable range of switch button 15*c*. When the switch unit 15 oriented in the full-lined position shown in the middle of FIG. 4 is brought from upper into engagement with the side grooves 33 and 34, the switch button 15*c* can be controlled for the operation of 100-volt supply current. On the contrary, when the power source is of 200 volts or so, the panel 35 is rotated 180 degrees from the aforementioned position so as to occupy the new position as denoted in the uppermost part of FIG. 4 and then inserted from upper into its operative position kept in full engagement with side grooves 33 and 34 as before, yet in a 180-degree turned-round new position. In this case, the motion-limiting opening 35*a* has been shifted a predetermined distance from right to left as shown in the lowest part of FIG. 4. In practice, said specified voltage values may have some positive or negative allowance, without remarkable change in the operation of the device.

When it is desired to operate the aforementioned device with 100-volt A.C.-current, the plug 36 is inserted into a socket, not shown, connected to a proper network, again not shown, of the same voltage, a switch button 15*c* is so manipulated to shift the gang switch contacts 37 and 38 from their full-line position down to their chain-line position. Thus, current will flow from the power source through plug 36, conductor 100, junction 101, conductor 102, contact 42, second switch element 38, contact 41, conductor 103, first winding 13, junction 104, conductor 105 and plug 36, back to the power source, on the one hand, and from junction 101 through second winding 14, conductor 106, junction 108, contact 39, first switch element 37, contact 40, conductor 107, junction 104 and so, back to the power source, on the other. Therefore, the coils 13 and 14 are energized in parallel to each other.

On the contrary, when it is desired to operate the device with 200-volt current, the plug 36 is a plug inserted into a socket, not shown, in the network of the same voltage, and the gang-connected switch elements 37 and 38 are shifted upwards to their chain-dotted line position shown in FIG. 5, by manipulating the switch button 15*c* leftwards and downwards in FIG. 4. In this case, current will flow from the power source, through plug 36, conductor 100, junction 101, second winding 14, conductor 106, junction 108, contact 43, second switch element 38, contact 48, conductor 103, first winding 13, junction 104, conductor 105 and plug 36, back to the power source. Therefore, in this case, the windings 13 and 14 are energized in series to each other.

When the windings 13 and 14 are energized either in parallel or in series to each other in the aforementioned manner with the A.C.-current, the common core 12 is magnetized and dismagnetized alternatively as is commonly known. In this way, the magnetic elements 21*a* and 21*b* are subjected to attraction and repulsion under the influence of the alternatively energized core 12 and thus the vibrator elements 18 and 19 are subjected to severe oscillation. Fluctuating magnetic fluxes are, in this case, transmitted from the core 12 through magnetic elements 21*a* and 21*b* and arms 18*b* and 19*b* to the tip ends 18*a* and 19*a* of vibrator elements 18 and 19.

Keeping these energized and vibrating conditions of the unit, a utilizer may grip the casing 10, 11 by his hand and bring cleaner member 20 into contact with the fouled surface of a magnetic head to be cleaned and de-magnetized. By the mechanical vibration of the cleaner element, the fouling foreign materials, if any, may be separated perfectly from the stuck head surface even within several seconds. After completion of this mechanical cleaning, the user may recede the tip ends 18*a* and 19*a* together with their cleaner element 20, thus the magnetic head being subjected to gradually decreasing influence of alternatively fluctuating magnetic fluxes and thereby the residual magnetism accumulated in the head can be removed according to the known teaching of the electromagnetic eraser.

In this way, the combined unit so far described will provide a double operation for mechanical cleaning of stuck particles on and magnetic erasure of residual magnetism in the magnetic head.

For instance, the wiper element can be impregnated with absolute alcohol or other inert solvent.

Without further detail description, the foregoing will so fully reveal the gist of the present invention that those skilled in the art can by applying current knowledge readily adapt it for various applications without omitting features that, from the standpoint of prior art, fairly constitute essential characteristics of the generic or specific aspects of this invention, and therefore, such adaptations should be intended to be comprehended within the range of equivalence of the following claims.

What is claimed as new and desired to be secured by Letters Patent is:

1. In a magnetic eraser for magnetic head, comprising an A.C.-current reception means adapted for electrical connection with an A.C.-current source; electromagnetic means electrically connected with said current reception means for generating alternatively fluctuating magnetic fluxes and an elongated magnetism-transmitting bar adapted for transmitting said fluxes to said magnetic head to erase its residual magnetism, the improvement wherein said transmitting bar is magnetically coupled with said electromagnetic means for transmitting said fluxes as well as electromagnetically oscillating movement emanated from said electromagnetic means to said magnetic head and that said bar is fitted at its tip end with a cleaner element made of a frictional material.

2. The improvement as set forth in claim 1, wherein said bar comprises two vibrator elements fixed to a common pivotable piece which is mounted pivotably on the bottom wall of a casing of said eraser.

3. The improvement as set forth in claim 3, wherein said vibrator elements are urged by a pair of compression springs acting in the opposite directions to each other.

4. The improvement as set forth in claim 1, wherein a transfer switch means is provided as the said current-reception means for transfer to separate and different voltage sources.

References Cited

UNITED STATES PATENTS

| | | | |
|---|---|---|---|
| 2,734,139 | 2/1956 | Murphy | 310—29 |
| 2,977,614 | 4/1961 | Demanuele | 15—22 |
| 3,030,967 | 4/1962 | Peyron | 15—22 |

LEE T. HIX, *Primary Examiner.*

DENNIS HARNISH, *Assistant Examiner.*

U.S. Cl. X.R.

335—284; 15—22; 310—29